United States Patent
Reid et al.

[15] 3,648,968
[45] Mar. 14, 1972

[54] FLUID FLOW CONTROL MECHANISM

[72] Inventors: John D. Reid, Monrovia; Arthur C. Seibel, Garden Grove, both of Calif.

[73] Assignee: Hamilton Company, Whittier, Calif.

[22] Filed: Aug. 7, 1969

[21] Appl. No.: 848,208

[52] U.S. Cl..............................251/57, 251/63.5, 251/122, 251/295, 251/282
[51] Int. Cl..............................F16k 31/363, F16k 47/04
[58] Field of Search.....................251/63.5, 63, 57, 282, 31, 251/295, 122

[56] References Cited

UNITED STATES PATENTS

| | | | |
|---|---|---|---|
| 2,634,754 | 4/1953 | Rahn | 251/31 |
| 3,385,561 | 5/1968 | Whalen | 251/282 |
| 2,070,489 | 2/1937 | McMichen | 251/295 X |
| 2,230,718 | 2/1941 | Gannestad | 251/282 X |
| 2,783,020 | 2/1957 | Kleczer | 251/63.5 |
| 2,811,958 | 11/1957 | Roush, Jr. | 251/63.5 X |
| 2,815,921 | 12/1957 | Bigelow | 251/282 X |
| 2,839,264 | 6/1958 | Trubert | 251/57 |
| 3,331,583 | 7/1967 | Baker | 251/282 X |
| 3,512,550 | 5/1970 | Ammann | 251/63 X |

Primary Examiner—Arnold Rosenthal
Attorney—J. C. Baisch and W. Britton Moore

[57] ABSTRACT

A foot pedal fluid control valve having a normally closed movable valve member substantially balanced by fluid pressure with the effective pressure in the closing direction sufficiently greater than the effective pressure in the opening direction to normally maintain said valve closed. The valve is connected with a pair of pistons of slightly different sized pressure areas upon which fluid pressure is exerted in opposite directions to render the valve very sensitive and responsive for very accurate control.

6 Claims, 4 Drawing Figures

PATENTED MAR 14 1972 3,648,968
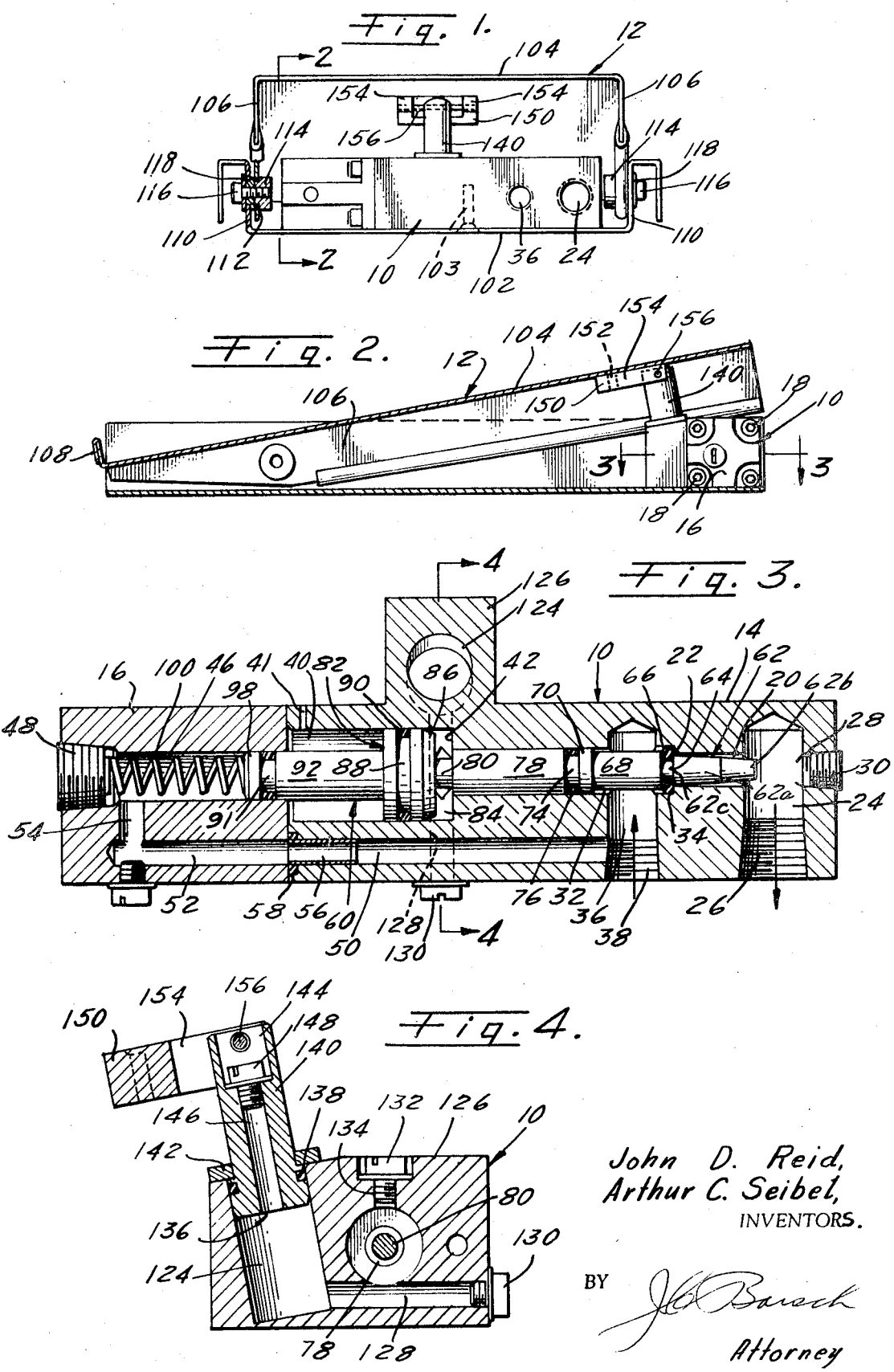
John D. Reid,
Arthur C. Seibel,
INVENTORS.
BY
Attorney 3,648,968

FLUID FLOW CONTROL MECHANISM

BACKGROUND OF THE INVENTION

1. Field of the Invention

This invention relates generally to fluid control valves and relates particularly to pneumatically operated control valves for pneumatically operated mechanisms.

Description of the Prior Art

There are pneumatic motors that require very smooth and accurate control for certain uses. Valves of various types have heretofore been used, such as, for example, mechanically operated or controlled valves. Fine and accurate control of such valves is very difficult as mechanical controls present various problems. For example, such valves may stick and/or function jerkily.

SUMMARY OF THE INVENTION

The present invention is a pneumatically operated and controlled valve mechanism for controlling the supply of pressure fluid to pneumatically operated mechanisms. There is a movable valve member having pistons or plungers with oppositely facing pressure areas of slightly different effective sizes upon which fluid under pressure acts. While the valve is normally closed and urged to the closed position by a normally slightly greater fluid force, the valve is substantially in balance except for the slightly different effective force in the closing direction.

The valve has two tapered portions in series, the forward portion having a greater taper than the rear portion, the latter being normally in the valve orifice so that as the valve is opened there is a finer control of the amount of pressure fluid passing through said orifice than when the forward portion with the greater taper cooperates with the orifice to control or regulate the pressure fluid flowing through said valve orifice.

OBJECTS AND ADVANTAGES OF THE INVENTION

It is an object of the invention to provide a fluid control valve mechanism providing an extremely smooth and accurate control and/or regulation of fluid under pressure for pneumatically operated mechanisms.

It is another object of the invention to provide a mechanism of this character wherein the valve is slightly unbalanced pneumatically in the closing direction.

Still another object of the invention is to provide a valve mechanism of this character that is very sensitive and responsive to valve operating pressures. It provides a feather touch control.

The characteristics and advantages of the invention are further sufficiently referred to in connection with the following detailed description of the accompanying drawings which represent an embodiment. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only:

FIG. 1 is a front end elevational view of the mechanism embodying the invention;
FIG. 2 is a sectional view taken on line 2—2 of FIG. 1;
FIG. 3 is a sectional view taken on line 3—3 of FIG. 2; and
FIG. 4 is a sectional view taken on line 4—4 of FIG. 3.

DESCRIPTION OF THE PREFERRED EMBODIMENT

Referring more particularly to the drawings, there is shown a foot valve mechanism which includes a valve mechanism, indicated generally at 10, and a pedal actuator mechanism, indicated generally at 12.

The valve mechanism comprises a pump and valve body 14 and a cylinder block 16 secured to one end of the body 14 by screws 18. Pump and valve body 14 have a longitudinally extending air outlet bore 20 with an outlet port 22 at the entrance thereof. Bore 20 terminates in a laterally extending passage 24 having a tapped outer end portion 26 into which a fitting, not shown, of a conduit, not shown, is screwed for connecting the valve with a mechanism to be pneumatically operated. For example, such pneumatically operated mechanism can be a pneumatic motor and, in referring to a pneumatically operated mechanism, it is to be understood that a pneumatic motor is referred to although any other pneumatically operated mechanism can be connected to and controlled by the present invention. There is a tapped bore 28 in line with the outlet bore 20 and an externally threaded removable plug 30 closes said tapped bore 28.

There is a longitudinally extending bore or cylinder 32 in axial alignment with the bore 20 but of greater diameter than said bore 20, said cylinder 32 terminating at the outlet port 22, there being a shoulder 34 normal to the axis of said bore 20 and cylinder 32 about the outlet port 22 and forming a valve seat about said outlet port. A laterally extending inlet passage 36 intersects the bore in upstream spaced relation to said outlet port 22, said passage 36 having a tapped outer end portion 38 into which a fitting, not shown, of a fluid pressure supply conduit, not shown, is connected with a source of pressure fluid or fluid under pressure.

The cylinder 32 extends but part way to the end of the body 10 opposite the inlet and outlet passages and opens into the adjacent inner end of a cylinder 40 of substantially greater diameter than the diameter of the cylinder 32, there being a shoulder 42 at the inner end of cylinder 40 about the adjacent end of the cylinder 32, said cylinder 40 being axially aligned with cylinder 32 and extending to the end of the body 10 opposite the inlet and outlet passages 26 and 36. An atmospheric vent 41 is provided for the cylinder 40 adjacent its outer end.

Cylinder block 16 is attached to the body at the outer end of the cylinder. Cylinder block 16 has a bore or cylinder 46 in axial alignment with cylinder 40 and opening into the outer end of said cylinder 40. Cylinder 46 is of very slightly larger diameter than the cylinder 32 and there is an enlarged tapped portion at the outer end of said cylinder 46 which is closed by an externally threaded removable plug 48. A fluid pressure passage 50 extends from the inlet passage 36 longitudinally of the body 10 to connect with a fluid pressure passage 52 extending from the inner end of the cylinder block and connecting with the cylinder 46 by means of a lateral passage 54 adjacent the outer end of said cylinder 46.

There is a sleeve 56 in an end portion of the passage 50 where it connects with the passage 52 in the cylinder block 16 and there is a groove about the outer end of said passage 50 for reception of a seal 58 which may be of any suitable character but is shown as an O-ring. This arrangement insures a seal against escape of fluid under pressure at the junction of said passages 50 and 52.

Longitudinally slidable in the bore 20 and cylinders 32, 40 and 46 is what is termed herein a valve core, indicated generally at 60.

The core 60 has a member, indicated generally at 62, movable with movements of said core, said valve member having an inner tapered part 62a from the outer end of which there extends an outer tapered end part 62b. Part 62a has a slight outward taper while part 62b has a greater outward taper. The inner end of the part 62a is of slightly smaller diameter than the diameter of the outlet port 22.

At the end of the valve member 60 opposite the part 62a, that is at the inner end or base 62c of the valve member, there is an annular groove 64 in which is received a seal 66, shown herein as an O-ring, although any other suitable seal may be used.

Extending away from the groove 64, the core has a part 68 of greater diameter than the diameter of the adjacent end of the valve member but of smaller outside diameter than the diameter of the cylinder 32, and at the inner end of the part 68 there is a piston 70 operably fitting in the cylinder 32 and slidable therein.

Behind the piston 70 there is an annular groove 74 in which a seal 76 is disposed. Seal 76 may be of any suitable character but is shown as an O-ring. Behind the groove 74 is a part 78 operably fitting in the cylinder 32 and from the rear end of said part 78 there extends longitudinally a relatively short reduced diameter part 80 which connects said part 78 with a piston, indicated generally at 82, operably disposed in the cylinder 40 and spaced from the shoulder 42 when the valve is closed, so that there is a cylinder portion 84 between the shoulder 42 and the adjacent end of piston 82.

Piston 82 has a short tapering forward end portion 86 and, intermediate its ends, said piston has an annular groove 88, in which is disposed a seal 90 which may be of any suitable character but is shown as an O-ring.

There is a core portion 92 which extends longitudinally from the piston 82 rearwardly into the cylinder 46 and adjacent the end of said portion 92 there is an annular groove 94 in which a seal 96 is disposed, said seal being of any suitable character but is shown as being an O-ring. A free end portion 98 of said portion 92 outwardly or rearwardly of the groove serves as a piston having a slightly greater pressure area than the piston 70.

A very light spring 100 reacts between the plug 48 and the piston 98. The primary purpose of spring 100 is to aid in assembly of the mechanism.

There is a foot valve base 102 to which the pump and valve body 14 is attached by screws 103 and to which the pedal actuator mechanism is also attached. The mechanism 14 includes a pedal 104 having depending side flanges 106 and an upturned flange 108 at the bottom, said flange 108 being bent back on itself. The pedal 104 is pivotally mounted or attached to upturned side flanges 110 of the base 102 which have aligned openings for reception of reduced end portions of bearings 112, and the side flanges 106 of the pedal 104 have aligned openings for reception or reduced diameter portions of bearings or nuts 114. Screws 116 pass through the bearings 112 and are screwed into tapped openings in bearings 114, washers 118 being disposed between respective flanges 110 and the heads of the screws 116. There are wear strips 120 disposed on the free edges of the flanges 106 of the pedal 104, said wear strips being of plastic or other suitable material and have longitudinally extending grooves for reception of edge portions of said flanges 106.

The pump and valve body 14 has a cylinder 124 in a projection or boss 126 thereof which is connected with the space 84 of the cylinder 40 between the piston 82 and the shoulder 42 by a fluid passage 128 which is closed at its outer end by a screw 130, which may be of lead or other suitable material resistant to the fluid therein which is a liquid such as brake fluid or the like. There is a similar screw 132 closing a passage 134 which extends outwardly from the cylinder 40.

Cylinder 124 is provided with a piston, indicated generally at 136, operably disposed therein, said piston having an annular groove therein for reception of a seal 138 which may be of any suitable character but is shown as being an O-ring. A piston rod 140 of reduced diameter relative to the piston extends slidably outwardly of the cylinder through an opening provided therefor in a retainer 142 which is attached to the boss 126 by means of screws, not shown. Piston rod 140 has a recess 144 extending longitudinally from the outer end and from said recess there is a passage 146 which extends to the inner end of the piston 136, said passage being closed by a screw 148 similar to the screws 130 and 132.

A pedal bracket 150 of generally U-shape is attached to the under side of the pedal 104 by means of screws 152, the arms 154 of said bracket 150 straddle the outer end of said piston rod 140 and said arms have aligned openings therein in which a pivot pin 156 is disposed, said pin extending through aligned openings provided therefor in the piston rod 140 adjacent its outer end. This arrangement permits sufficient pivoting or articulation between the pedal and piston rod when the pedal is actuated to prevent binding of the piston and piston rod.

Filling the pump system with fluid is effected through the passage 146 in the piston 136 and piston rod 140 after the screw 148 has been removed. Bleeding the system is effected by removal of screws 130 and 132 according to the need therefor. Bleeding may also be effected through the passage 146. After the system has been filled and bled the screws 130, 132 and 148 are replaced.

Air pressure from a source of such pressure is provided in the inlet passage 36 and such pressure is applied against the piston 70 and against the piston 98. Because of the difference in the effective pressure areas of the pistons 70 and 98, the air pressure acting against such pressure areas urges the core 60 to the right, as shown in FIG. 3, and effects seating of the O-ring 66 against the shoulder 22 thereby preventing any air from flowing past the valve member 62. Thus, the valve core is substantially balanced pneumatically but with a bias in the valve closing direction to normally effect closing of said valve. While spring 100 also urges the valve core 60 in the valve closing direction, said spring is extremely light and exerts a negligible force thereon.

Actuation of the foot pedal 104 will actuate the pump piston 82 which in turn actuates the valve piston 82 by hydraulic pressure.

When the valve core 60 initially moves in the valve opening direction, that is to the left as shown in FIG. 3, the valve part 62a is within the outlet port 22 and, since this part of the valve member 62 has only a slight taper, a slight amount of air under pressure will flow through the outlet port to the outlet passage 24. This slight amount of air under pressure can be such as to cause a pneumatic motor connected to the outlet passage 24 to operate at a very low r.p.m. As the pedal 104 is actuated further, the valve core is moved further in the opening direction and more air under pressure is allowed to flow through the outlet port but the rate of increase of air under pressure to the pneumatic motor is less than the rate of increase after the part 62b of the valve member 62 enters the outlet port.

Release of foot pressure on the pedal results in the valve core moving to the valve closed position as a result of the air pressure on the pistons 70 and 98 with the great effective pressure in the closing direction. The valve core piston 82 then forces the hydraulic fluid back into the cylinder 124 causing the piston 136 to move outwardly and move the pedal to the normal upper position. Thus, the mechanism controls or regulates the supply of air under pressure to a pneumatically operated mechanism or device.

When the valve core initially moves in the valve opening direction, air cannot flow through the outlet port until the seal or O-ring 66 has been moved into the outlet passage 36. Thereafter, the position of the valve member 62 determines the amount of air under pressure flowing through the outlet port. In other words, no air will flow through the outlet port while the O-ring is in the bore position between the passage 36 and the shoulder 34, whether the valve core is moving in the opening or the closing direction.

Vent 41 vents the portion of cylinder 40 behind the piston 82 to prevent pressure behind said piston which would interfere with the functioning of the mechanism.

We claim:

1. A fluid flow control mechanism, comprising:
 A. means defining an outlet port and a fluid inlet having a connection with said outlet port;
 B. a movable valve member cooperating with said outlet port to control the flow of fluid therethrough;
 C. means connected with said movable valve member for actuating same, said means having pistons with opposed pressure areas for urging said movable valve member in opening and closing directions, respectively, the pressure on one of said pistons being effective to urge said valve in the closing direction with slightly greater force than the effective pressure on the other of said pistons;

D. fluid pressure operated means for moving said valve member in the opening direction,
   said means for moving the valve member in the opening direction includes a hydraulic cylinder and a third piston therein having a pressure area on which hydraulic pressure acts in the valve opening direction; a second hydraulic cylinder; a fourth piston operably mounted in said hydraulic cylinder, said piston having a pressure area adapted to be subjected to hydraulic pressure for urging the valve member in the valve opening direction, a piston rod for the fourth piston; a pedal having an operable connection with said piston rod; and means operably connecting the hydraulic cylinders together.

2. The invention defined by claim 1, wherein the pedal has a pivotal connection with the piston rod.

3. A fluid flow control mechanism, comprising:
A. means defining an outlet port, an inlet passage and a series of cylinders in axial alignment with each other and with the outlet port, there being
   a. a first cylinder,
   b. a second cylinder of substantially greater diameter than the first cylinder,
   c. and a third cylinder of slightly greater diameter than the first cylinder;
B. a valve core having
   a. a valve member cooperable with the outlet port and movable to vary the effective size of said port,
   b. a first piston operably disposed in the first cylinder, and having a pressure area on which fluid pressure acts in the valve opening direction,
   c. a second piston operably disposed in the second cylinder,
   d. a third piston operably disposed in the third cylinder, said third piston having a slightly greater oppositely positioned effective pressure area than that of the first piston and
   e. passageway means in the first mentioned means for conveying fluid under pressure to the first and third pistons to slightly unbalance the valve core pneumatically in the valve closing direction,
C. and means for applying fluid pressure to the second piston in the valve opening direction.

4. The invention defined by claim 3, wherein the last mentioned means comprises hydraulic means.

5. The invention defined by claim 3, wherein there is a short cylinder portion at the upstream side of said port terminating in a shoulder at said port; said valve core having an annular groove at the inner end of the valve member; and a seal in said groove, said seal being in said short cylinder portion and bearing against said shoulder when the valve member is in the valve closed position.

6. The invention defined by claim 5, wherein said valve member has an inner tapered portion and an outer tapered portion, the latter having a greater taper than the inner portion, the base of the inner portion being disposed in said port when the valve member is in the valve closed position.

* * * * *